US007500290B2

(12) United States Patent
Klingler

(10) Patent No.: US 7,500,290 B2
(45) Date of Patent: Mar. 10, 2009

(54) SIMPLE CLIMBER'S MULTI-TOOL

(76) Inventor: Gregory Lee Klingler, 824 E. Iowa Ave., Denver, CO (US) 80210

( * ) Notice: Subject to any disclaimer, the term of this patent is extended or adjusted under 35 U.S.C. 154(b) by 402 days.

(21) Appl. No.: 11/469,900

(22) Filed: Sep. 5, 2006

(65) Prior Publication Data

US 2008/0011544 A1 Jan. 17, 2008

Related U.S. Application Data

(63) Continuation-in-part of application No. 11/457,810, filed on Jul. 16, 2006.

(51) Int. Cl.
*A62B 1/16* (2006.01)
*A62B 1/20* (2006.01)
*F16G 11/00* (2006.01)

(52) U.S. Cl. ........................................ 24/115 R; 182/5

(58) Field of Classification Search ............... 24/115 R, 24/112.6, 128, 115 F, 136 K; 182/5
See application file for complete search history.

(56) References Cited

U.S. PATENT DOCUMENTS 3,775,811 A * 12/1973 Smrekar et al. ........... 24/115 R
5,947,229 A * 9/1999 Hede et al. ..................... 182/5
6,192,558 B1 * 2/2001 Badura ...................... 24/599.1
D466,794 S * 12/2002 Malkiel ....................... D8/356
2003/0034203 A1 * 2/2003 Hewlett et al. ................. 182/5
2007/0187176 A1 * 8/2007 Christianson ................. 182/5

* cited by examiner

*Primary Examiner*—Robert J Sandy

(57) ABSTRACT

A Simple Climber's Multi-Tool which performs multiple safety functions for the field of rock climbing. The device is a convenient effective safety back-up device to be used with a solo lead climbing belay device. The device also functions as a standard belay and rappel device. With the addition of an Attachment Snap Hook, the device is an auto-locking belay device for one or two ropes. With the addition of a loop of cord, it can perform functions otherwise performed with specialty knots for safety and self-rescue such as the Prusik knot, Bachman knot, and Klemheist knot. The device can be easily moved along the rope when the First Snap Hook is gripped and pulled with respect to either end of the rope, but will jam the rope against movement when the Main Body of the device is constrained from movement and an end of the rope is pulled with respect to the device.

18 Claims, 6 Drawing Sheets

SIMPLE CLIMBER'S MULTI-TOOL

CROSS-REFERENCE TO RELATED APPLICATIONS

Continuation-in-part of application Ser. No. 11/457,810, filed on Jul. 16, 2006.

STATEMENT REGARDING FEDERALLY SPONSORED RESEARCH AND DEVELOPMENT

Not applicable.

This is a Continuation-In-Part application of application Ser. No. 11/457,810, filed Jul. 16, 2006. The entire disclosure of the prior application is hereby incorporated by reference in its entirety.

BACKGROUND

1. Field of the Invention

This invention pertains to a device which, when attached to a rope, can be easily moved along the rope using one hand, but can jam the rope against movement when a certain portion of the device is constrained from movement and an end of the rope is pulled with respect to the device. Within the field of rock climbing, this device meets a currently unmet need for a back-up safety device for solo climbing activities. With the addition of a cord, the device can also be used in place of many of the safety friction knots used in the field of rock climbing. Certain embodiments of the device also provide the functionality of a standard simple belay and rappel device. Certain embodiments of the device also function as an auto-locking belay device. The device can be produced to accommodate either one or two ropes.

2. Description of Prior Art

In the sport of rock climbing, a belay device is used to protect a climber from injury in the case of a fall. Generally the climber wears a harness to which one end of a rope is attached. The rope passes through a belay device that is often attached to the harness of another person, the "belayer". The belayer operates the belay device and typically remains at a stable point while the climber ascends. When the climber is "lead" climbing, the climber drags the rope up the rock as he ascends. At various points during the ascent, the climber clips the rope into metal loops (carabiners) that, in turn, are attached to the surface of the rock. When the climber is "top-rope" climbing, the rope extends down toward the climber from above. In the case of lead climbing, the belayer feeds out rope as the climber ascends. In the case of top-rope climbing, the belayer takes in rope as the climber ascends. In either case, if the climber falls, the belayer must grasp the rope securely by means of the belay device. The fall is therefore stopped by means of the belay device and the climber comes to rest suspended from above by the rope. Thereafter, the belayer may gently lower the climber to the ground by operating the belay device so as to gradually release tension on the rope. Anyone experienced in rock climbing is familiar with this practice and with the various forms of belay devices.

The simplest, most common, belay device is made up of a solid piece with one or two oval passages and a containment loop. The version with two oval passages can handle two ropes simultaneously. In use, a loop of rope is threaded through the oval passage and a carabiner is clipped through the rope loop as well as the containment loop. The carabiner is also attached to the harness of a belayer. When a climber falls, the rope passing through the oval passage causes the carabiner to be pulled against the surface of the solid piece.

The oval passage opening is dimensioned so as to constrain the rope when the carabiner is pulled against it. These devices provide friction to slow the rope, but they all require the belayer to provide additional braking force in order to stop the rope. An example of this simple type of belay device is the ATC Climbing Belay Device by Black Diamond Equipment Ltd. of Salt Lake City, Utah.

Another class of belay devices, auto-locking belay devices, generally consists of relatively more complicated designs, often with moving parts, which have the benefit of requiring no action on the part of a belayer in order to stop a fall. An example of this class of auto-locking devices is found in U.S. Pat. No. 5,577,576 to Petzl et al. which has been commercially introduced as the GriGri Climbing Belay Device by Petzl of Crolles, France. A negative aspect of most of the devices in this class is the fact that the belayer, when required to feed out rope rapidly to the lead climber, must temporarily override the locking function of the device. If a climber falls at this moment, the belayer must release the override of the locking function, otherwise the climber will continue to fall. Another negative aspect of this class is that most auto-locking belay devices on the market will accommodate only one rope, rendering them unsuitable for dual-rope climbing and dual-rope rappelling activities.

One sub-class of auto-locking belay devices consists of devices produced specifically for solo lead climbing in which the climber climbs alone without the assistance of a belayer. In solo lead climbing, the climber anchors a rope at the bottom of the climb and attaches the belay device directly to his harness. As the climber ascends, the free side of the rope is pulled through the belay device by the anchored side of the rope. The climber periodically clips the anchored side of the rope to the rock surface. A commercial example of a belay device for solo lead climbing is the Soloist produced by Wren Industries of Grand Junction, Colo. A very significant negative aspect of many of these devices, including the Soloist, is the fact that, although they will catch a climber if he falls in the upright position, they will not catch a climber if he falls upside down. Because of this danger, producers of these devices recommend that the devices be backed-up by a series of loop knots spaced apart along the free end of the rope, the knots being large enough to catch against the device rather than be pulled through the device. Although adding one element safety, this method of backing-up the device greatly complicates the climbing activity and can, in fact, introduce an element of danger. Each loop knot has to be untied as it reaches the device in order for the rope to continue to feed through the device. On most climbs, a climber periodically can free one hand for this knot untying activity but can almost never free both hands. It is very difficult to untie these knots with only one hand and at times it is risky to even free one hand from the rock surface in order to untie a knot.

A recent new type of belay device, found in U.S. Pat. No. 6,681,891 to Richard et. al., combines the functionality of a simple belay and rappel device with a rope jamming function. Unlike the subject invention, in order to invoke the rope jamming function the device must be fixedly attached to the rock surface in a specific orientation. When anchored in this specific orientation, the device will jam the rope when the rope is pulled in one direction but will not jam the rope when it is pulled in the opposite direction.

Within the sport of rock climbing there are a variety of friction knots for safety back-up and self rescue applications including the Prusik knot, the Bachman knot, and the Klemheist knot. All of these friction knots contain a cord that wraps around the climbing rope at one end and is anchored to a fixed point at the other end, usually by a snap hook such as a carabiner. These knots allow the rope to move through them if the knot is held while the rope moves, but lock the rope against movement if the knot is released. Once the knot is released it tends to move along with the movement of the rope. Tension is caused by the rope against the knot as the knot is pulled away from its anchor point and this tension causes the knot to tighten thus stopping the movement of the rope. Unfortunately, none of these types of knots can form a suitable safety back-up for the belay device used in solo climbing activities because, since the belay device moves along with the climber, there is no suitable fixed anchor point. If the climber were to anchor the knot to himself, the anchor location would be too close to the belay device itself to be suitable for this particular application.

The devices of the prior art, including those mentioned above, do not disclose, teach or illustrate the unique structure, function and advantage of the subject Simple Climber's Multi-Tool.

SUMMARY

The essence of the present invention is a simple climber's multi-tool for use in the sport of rock climbing and for certain industrial applications involving fall protection. The device offers safety back-up functionality, for solo climbing activities, not presently found in any climbing protection devices. It functions directly as an auto-locking belay device and can also be used as a back-up safety device for a belay device. The device also provides easy and controlled release of a load on the rope, necessary in order to safely lower a climber after a fall. Certain embodiments of the subject invention also provide the functionality of a simple manual belay and rappel device. With the addition of a cord, the device can also perform many of the same functions performed by friction knots used within the sport of rock climbing. Since minimizing weight is a critical concern of climbers, any device which provides multiple functions is a great benefit.

OBJECTS AND ADVANTAGES

A primary object of the subject invention is to provide a simple safety device for climbing that perform multiple functions which heretofore have required multiple devices.

Another object is to provide a simple movable rope jam that can serve as a safety back-up for a belay device for solo climbing activities. The subject invention can be very easily moved along the rope using only one hand but will jam the rope in the event that the climber falls upside down thus causing the subject invention to be pulled by the rope against the solo climber's belay device.

Another object is a device that functions as an auto-locking belay device.

Another object is a device that can function as a safety back-up to a typical auto-locking belay device to protect against dangerous consequences if a novice belayer happens to freeze-up if the climber falls when the belayer has overridden the normal locking function of the belay device. The subject invention can be placed on the free end of the rope, behind the belay device, and can easily be periodically moved backwards along the rope as it approaches the belay device. If the belayer happens to freeze-up when a climber falls while the belayer has the locking function overridden, the subject invention will be pulled against the belay device by the rope, thus causing the subject invention to jam the rope.

Another object is a device that, with the addition of a cord, can perform many of the same functions performed by friction knots used in the sport of climbing such as the Prusik knot, the Bachman knot, and the Klemheist knot. The climber can thus achieve the functionality of these knots without having to spend the time, or master the technique, to tie these knots.

Another object is that the device is inexpensive relative to its performance features. The main body of the subject invention can be easily machined or cast from a small amount of metal such as aluminum or steel. The main body can be made of stamped aluminum or stamped steel.

Another object is to provide an embodiment of the device that additionally offers the functionality of a simple belay and rappel device.

Another object is that the device is capable of jamming a rope securely.

Another object is that the device is capable of jamming ropes of varying diameters, including those of relatively small diameter.

Another object is that the device does not cause undue wear on a rope. The device contains no teeth or rough surfaces with which to grip the rope. The surface that pinches the rope can be made with sufficient area so as to distribute the pinch force in a manner that does not cause damage or excessive wear to the rope.

Another object is that the device is relatively small and lightweight.

Another object is to provide an embodiment of the device that can accommodate two ropes simultaneously.

Another object is to provide an embodiment that offers easy and controlled release of a load on the rope once the rope has been jammed by the device. This is critical for rappelling activities and for safely lowering a climber after a fall.

These and other objects of the subject invention will become apparent to those familiar with the different types of climbing safety equipment when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

DRAWING FIGURES

FIG. 1 presents a first perspective view of a First Embodiment Simple Climber's Multi-Tool.

FIG. 2 presents a second perspective view of the First Embodiment Simple Climber's Multi-Tool.

FIG. 3 presents the First Embodiment Simple Climber's Multi-Tool threaded with a rope in a configuration so as to be used as a movable rope jam.

FIG. 4 presents a top view of the First Embodiment Simple Climber's Multi-Tool.

Figure 8:
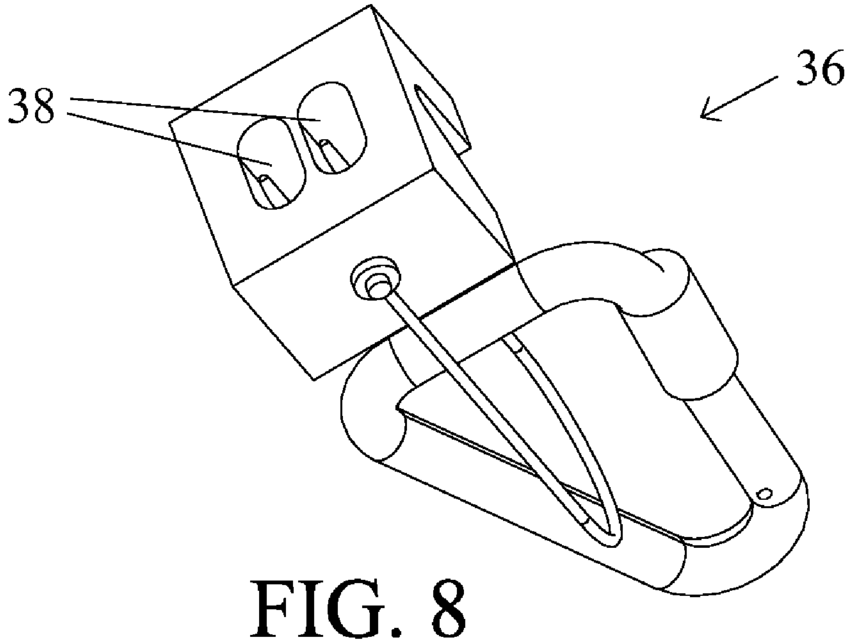

FIG. 8 presents a Second Embodiment Simple Climber's Multi-Tool which can be used with two ropes.

Figure 9:
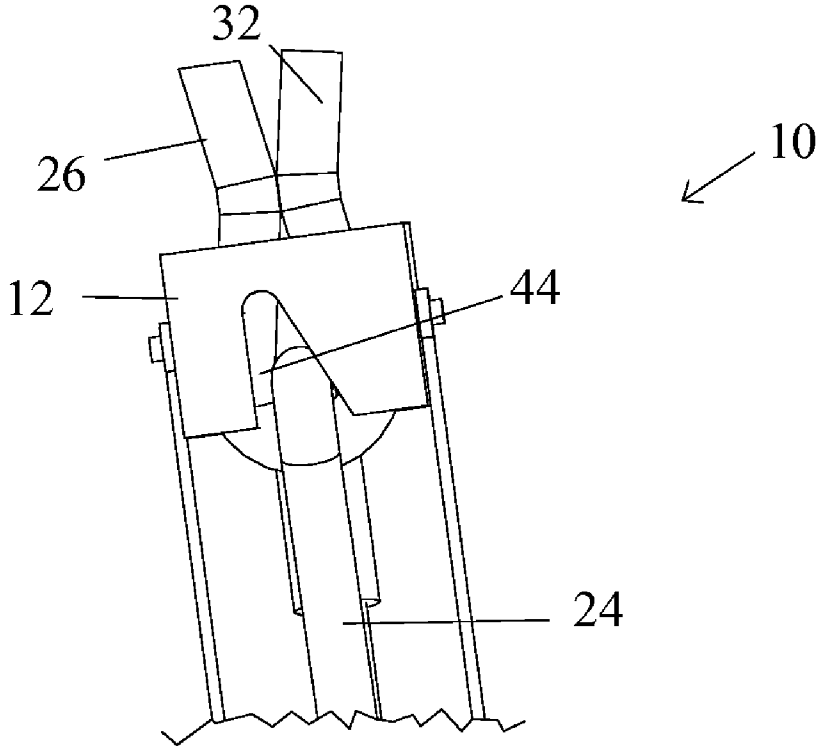

FIG. 9 presents a close-up view of the First Embodiment Simple Climber's Multi-Tool illustrating the pinch that is exerted on the rope when the device jams the rope.

Figure 10:
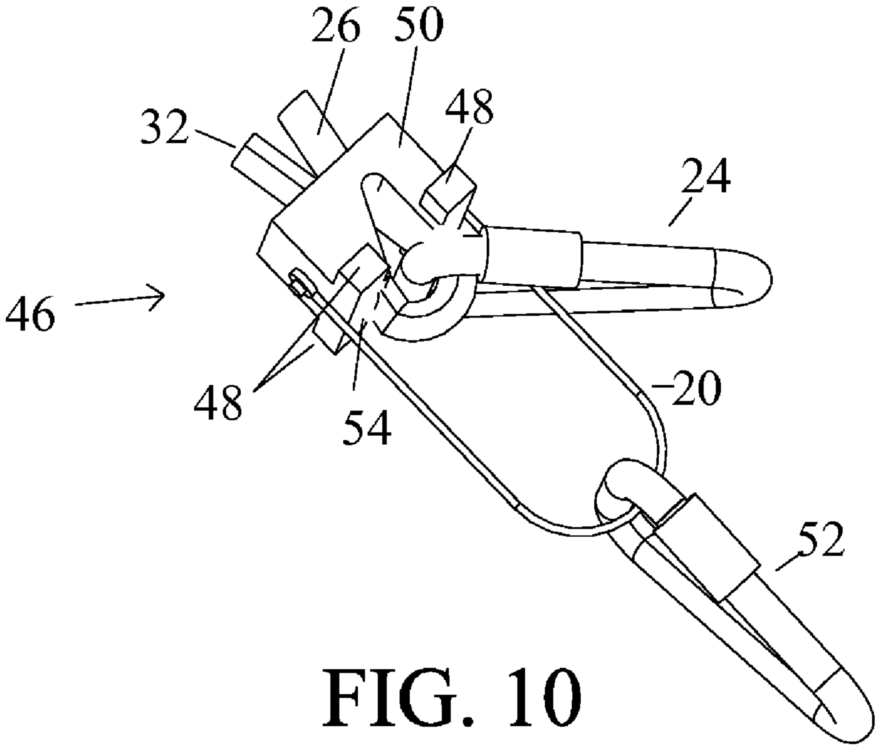

FIG. 10 presents a Third Embodiment Simple Climber's Multi-Tool demonstrating the use of the device as an auto-locking belay device.

Figure 11:
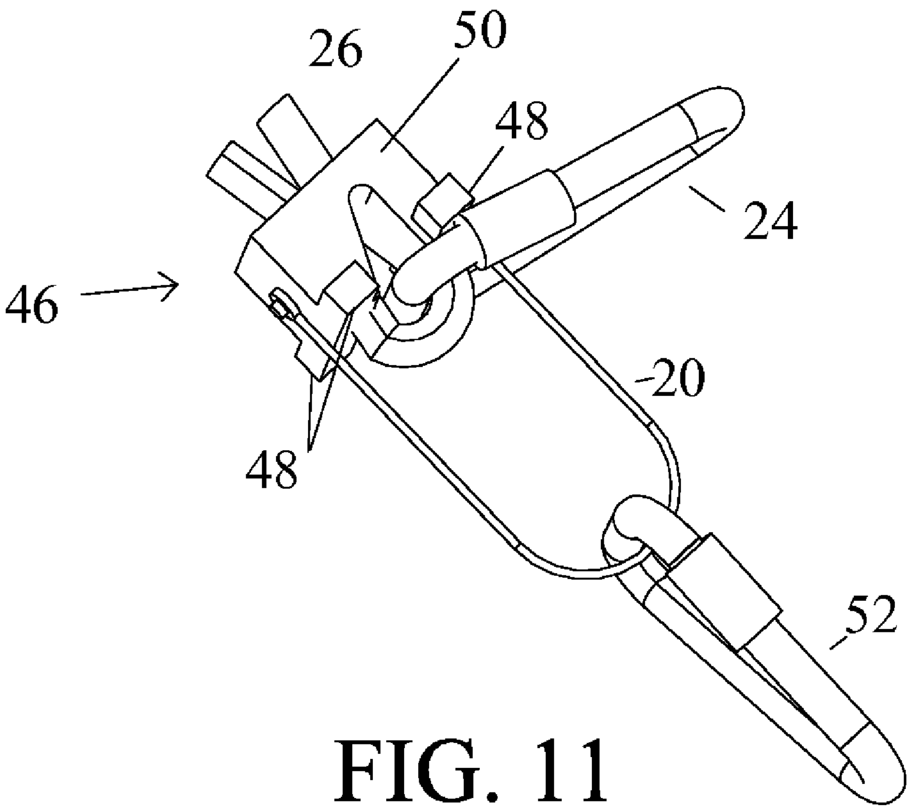

FIG. 11 presents the Third Embodiment Simple Climber's Multi-Tool illustrating the process of releasing tension on a rope.

Figure 12:
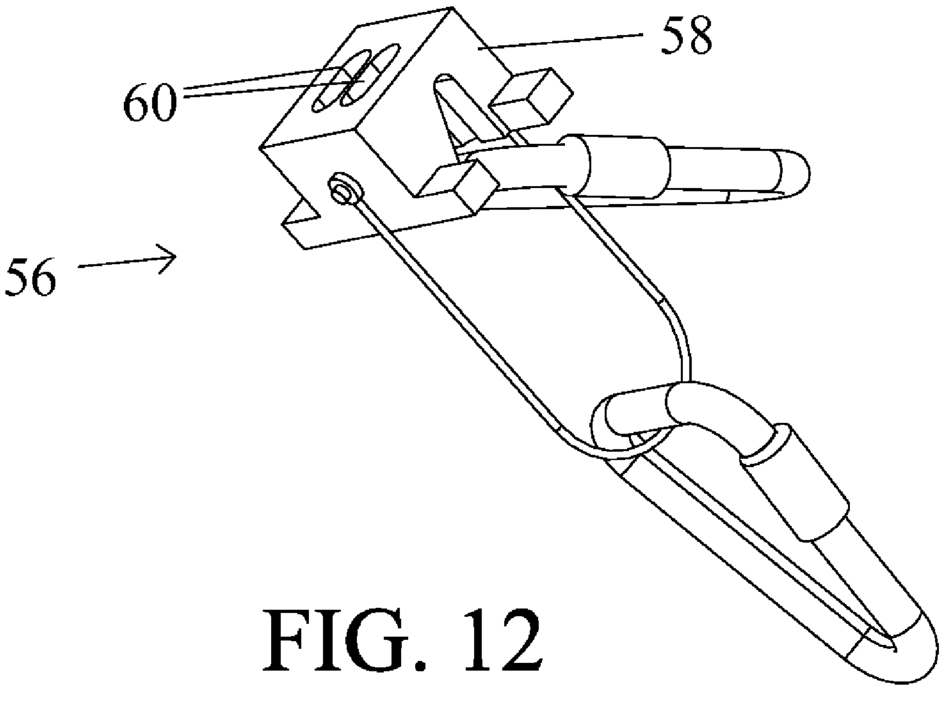

FIG. 12 presents a Fourth Embodiment Simple Climber's Multi-Tool demonstrating use of the device as an auto-locking belay device for two ropes.

REFERENCE NUMERALS IN DRAWINGS

10 First Embodiment Simple Climber's Multi-Tool
12 Main Body
13 Front Face
14 Open Front Area
15 Back Face
16 Open Back Area
18 Rope Channel
20 Snap Hook Containment Loop
22 Attachment Points
24 First Snap Hook
26 Rope
28 Middle Portion
29 Extents
30 Sloping Recessed Face Portion
31 Non-Sloping Recessed Face Portion
32 Rope Fixed End
33 Side Wall
34 Cord
36 Second Embodiment Simple Climber's Multi-Tool
38 Dual Rope Channels
44 Rope Pinch Region
46 Third Embodiment Simple Climber's Multi-Tool
48 Extended Ends
50 Third Embodiment Main Body
52 Attachment Snap Hook
54 Third Embodiment Back Face
56 Fourth Embodiment Simple Climber's Multi-Tool
58 Fourth Embodiment Main Body
60 Fourth Embodiment Dual Rope Channels

DESCRIPTION AND OPERATION

Figure 1:
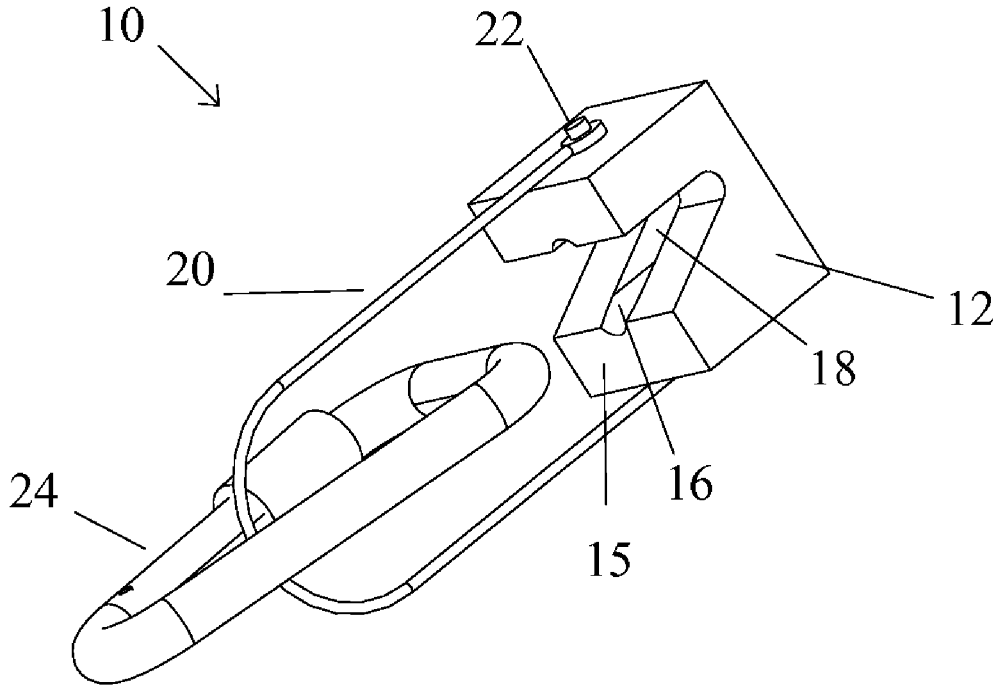
Figure 2:
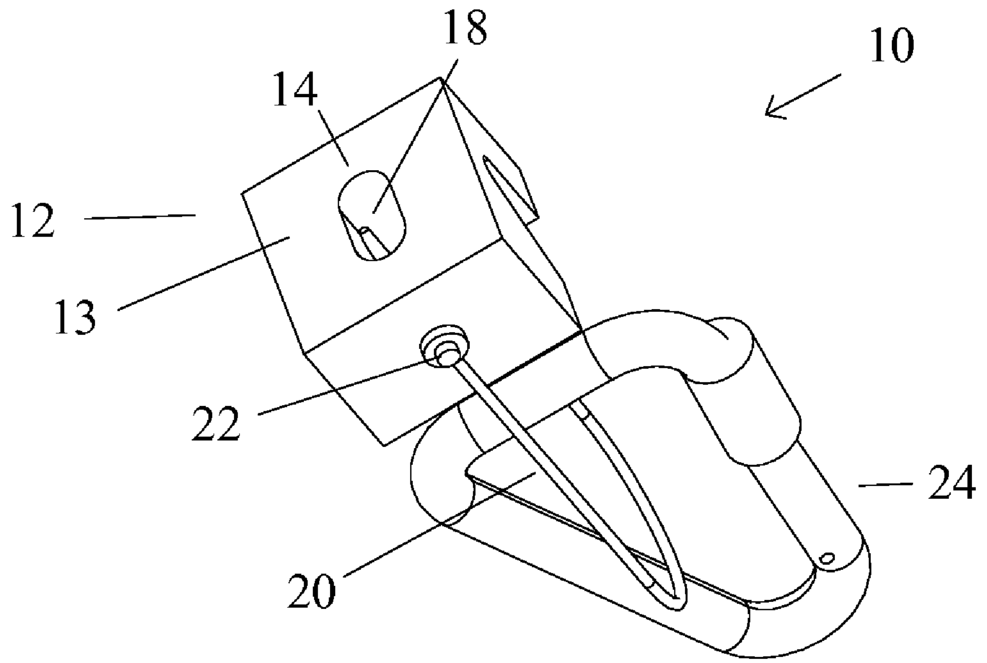

FIGS. 1 and 2 present two perspective views of a First Embodiment Simple Climber's Multi-Tool (10) which has a Main Body (12) with a Front Face (13) with an Open Front Area (14), a Back Face (15) with an Open Back Area (16), and a Rope Channel (18) passing between the Open Front Area (14) and the Open Back Area (16). A Snap Hook Containment Loop (20) is attached to the Main Body (12). In this embodiment, the Attachment Points (22) for the Snap Hook Containment Loop (20) allow the Snap Hook Containment Loop (20) to pivot with respect to the Main Body (12). The snap hook containment loop is made of solid steel, solid aluminum, or braided steel wire cable. A First Snap Hook (24) is not fixedly attached to the Main Body (12). As FIG. 3 indicates, the Rope Channel (18) is dimensioned so as to allow, with slight clearance, the placement of two strands of a Rope (26) [not part of the invention] to be used with the device. As FIG. 4 shows, a top view of the device demonstrates that the Middle Portion (28) of the Back Face (15) is recessed with respect to the Extents (29) of the Back Face (15). The recessed Middle Portion (28) has a Sloping Recessed Face Portion (30) opposite from a Non-Sloping Recessed Face Portion (3 1). The Sloping Recessed Face Portion (30) slopes toward the Non-Sloping Recessed Face Portion (31) in the direction from the Back Face (15) towards the Front Face (13).

Figure 3:
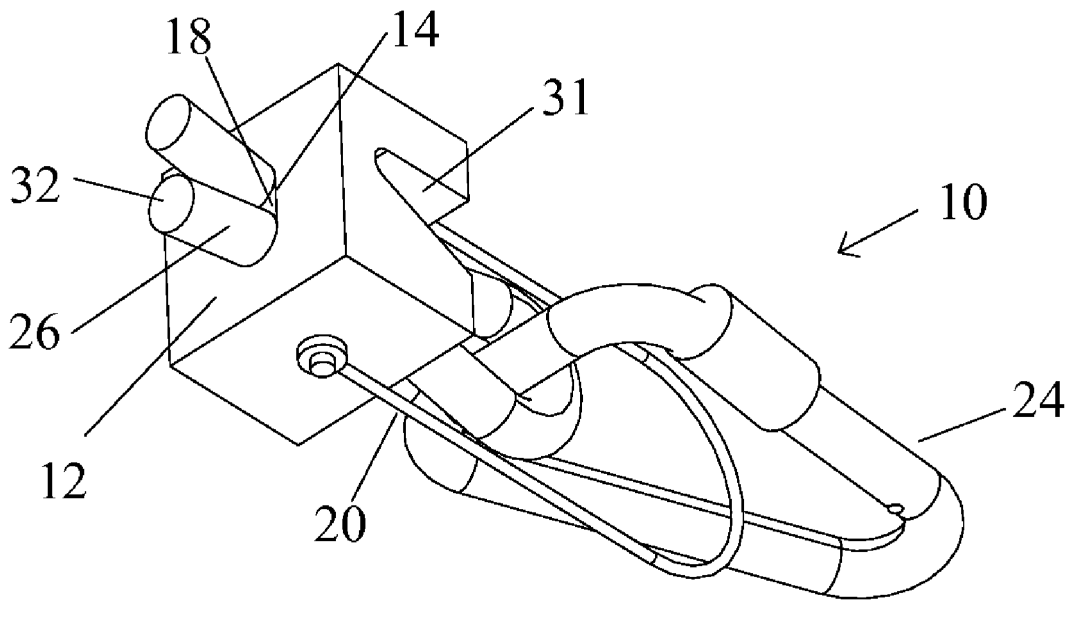
Figure 4:
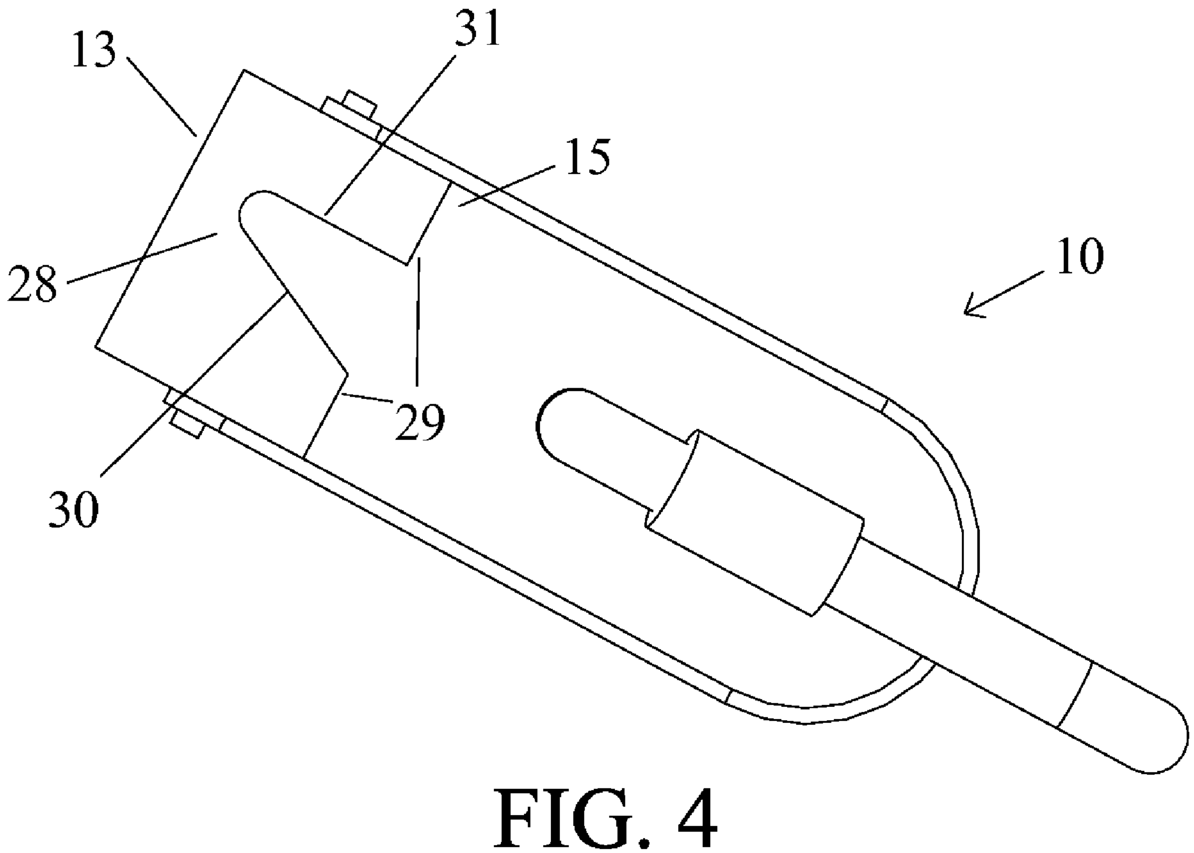
Figure 5:
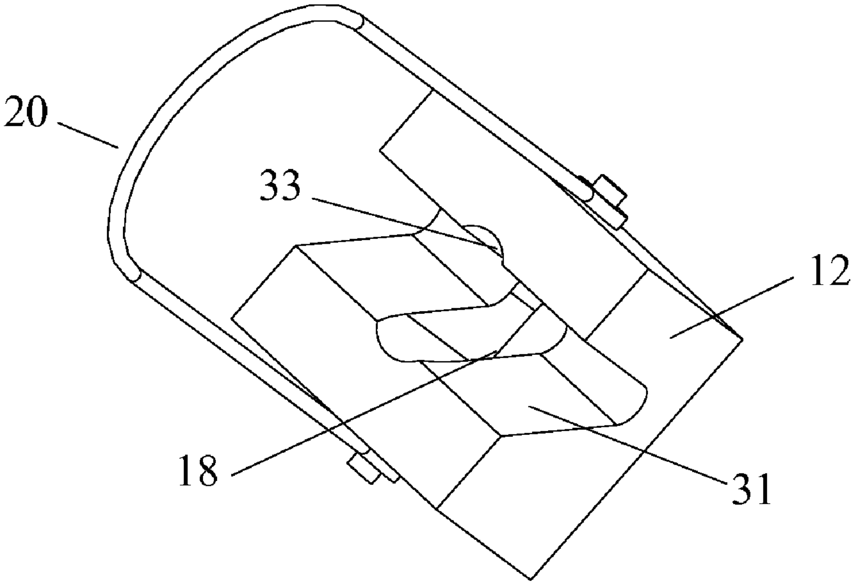
FIG. 5 illustrates the side walls of the rope channel of the First Embodiment Simple Climber's Multi-Tool.

As shown in FIG. 3, in use as a rope jam, a loop of the Rope (26) is threaded into the Open Front Area (14), through the Rope Channel (18—partially hidden), and out the Open Back Area (16—completely hidden in this figure). The First Snap Hook (24) is then clipped through both the loop of Rope (26) and the Snap Hook Containment Loop (20). The device may be easily moved along the Rope (26), in either direction, by grabbing the First Snap Hook (24) and pulling it in a direction away from the Rope Fixed End (32). By pulling on the First Snap Hook (24), the First Snap Hook (24) stays away from the Main Body (12) and the Rope (26) easily feeds into the Rope Channel (18), around the First Snap Hook (24) and back out the Rope Channel (18). If, however, the Rope (26) is pulled from the Rope Fixed End (32), and the Main Body (12) is constrained against moving along with the Rope (26), the device will jam the Rope (26) against further movement. In this situation, the pull on the Rope (26) from the Rope Fixed End (32) causes the First Snap Hook (24) to be pulled into the Middle Portion (28) of the Open Back Area (16). The slope of the Sloping Recessed Face Portion (30) causes the First Snap Hook (24) to move toward the Non-Sloping Recessed Face Portion (31) as the First Snap Hook (24) is drawn into the Middle Portion (28) by the pull on the Rope Fixed End (32). The Rope (26) thus jams as it becomes pinched between the First Snap Hook (24) and the Side Wall (33), shown in FIG. 5, of the Rope Channel (18). Thus, the unique shape of the Middle Portion (28) of the Open Back Area (16) of the subject invention is a key element providing functionality not found in other climbing safety devices. The movement of the First Snap Hook (24) toward the Side Wall (33) as the First Snap Hook (24) is drawn into the Middle Portion (28), caused by the slope of the Sloping Recessed Face Portion (30), enables the device to jam ropes of many different diameters including very small diameters.

Figure 6:
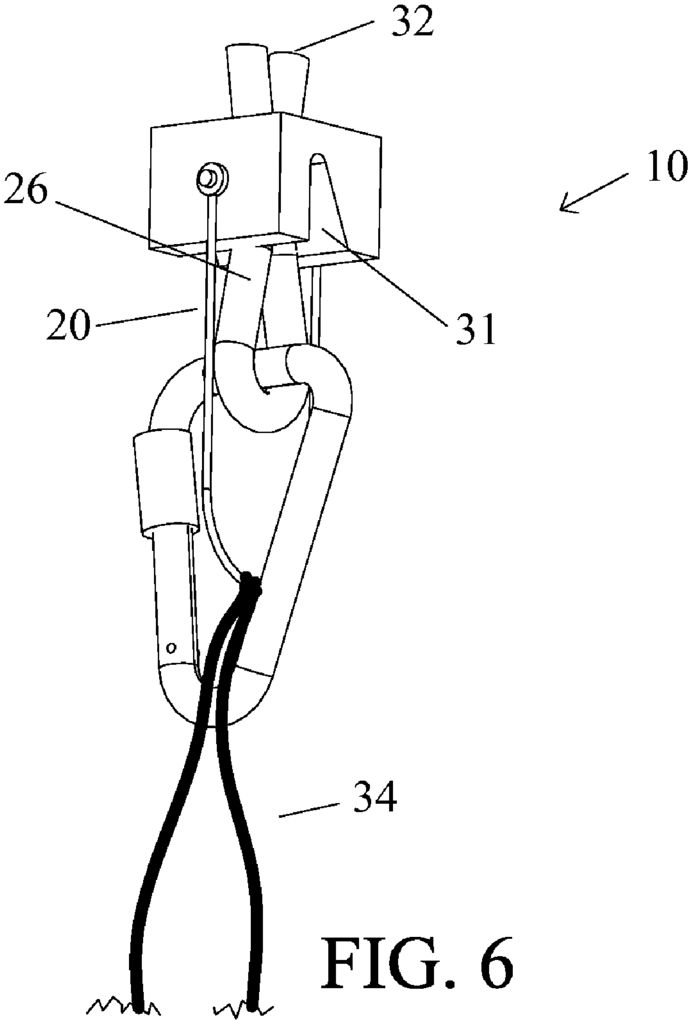
FIG. 6 illustrates a configuration of the First Embodiment Simple Climber's Multi-Tool which allows it to operate as a standard friction knot with the addition of a cord.

Unlike any of the friction knots used in the sport of rock climbing, the subject invention will jam the Rope (26) whenever the rope begins to be pulled from the Rope Fixed End (32), as long as the Main Body (12) is constrained from movement, regardless of the direction of force that is constraining the Main Body (12). For a friction knot to function effectively, the anchor point has to be upstream from the knot, relative to the direction of rope movement, and the force therefore pulls on the knot to tighten it. The subject invention will jam the Rope (26) whether the Main Body (12) is constrained by an upstream "pulling" force or a downstream "pushing" force. Therefore, in addition to having functionality not provided by a friction knot, the subject invention can be easily adapted to function as a friction knot by the addition of a Cord (34) [not part of the invention]. As FIG. 6 demonstrates, a loop of Cord (34) can be attached to the Snap Hook Containment Loop (20) by many methods including, as shown here, a simple girth hitch. By anchoring the loop of Cord (34) to a fixed anchor point (not shown), the subject invention will function as does a friction knot.

Figure 7:
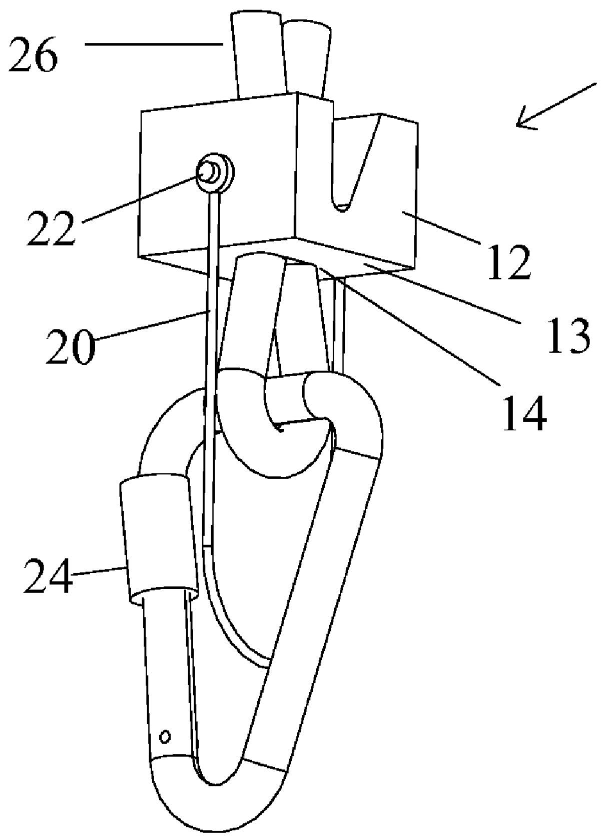
FIG. 7 illustrates a configuration of the First Embodiment Simple Climber's multi-Tool which allows it to act as a standard belay and rappel device.

As shown in FIG. 7, the pivotal Attachment Points (22) of this First Embodiment Simple Climber's Multi-Tool (10) allow the Snap Hook Containment Loop (20) to be rotated into a position extending beyond the Front Face (13). When in this configuration, and with the Rope (26) threaded in the opposite direction as when threading the device to be a rope jam, the loop of Rope (26) thus extending beyond the Front Face (13), the subject invention can function as a simple manual belay and rappel device such as the ATC Climbing Belay Device by Black Diamond Equipment Ltd. of Salt Lake City, Utah.

FIG. 8 shows a Second Embodiment Simple Climber's Multi-Tool (36) with Dual Rope Channels (38). This embodiment can handle two ropes simultaneously, which can be beneficial in certain situations, especially when rappelling. This embodiment is otherwise analogous to the First Embodiment Simple Climber's Multi-Tool (10).

FIG. 9 presents a close-up view of a portion of the First Embodiment Simple Climber's Multi-Tool (10) illustrating the Rope Pinch Region (44) caused by the pinch that is exerted on the Rope (26) as the First Snap Hook (24) is drawn into the recessed region of the Main Body (12) by the forces of the Rope (26) from the Rope Fixed End (32).

FIG. 10 presents a Third Embodiment Simple Climber's Multi-Tool (46) demonstrating the use of the device as an auto-locking belay device. This figure shows the Rope (26) already having been locked by the device. In addition to the elements found comprising the First Embodiment Climber's Multi-Tool (10), this device has Extended Ends (48) on the Third Embodiment Main Body (50) and an Attachment Snap Hook (52). The Extended Ends (48) serve to lengthen the Third Embodiment Main Body (50) at the Third Embodiment Back Face (54). In use, the Attachment Snap Hook (52) is clipped through both the Snap Hook Containment Loop (20) and the belayer's harness (not shown). The Attachment Snap Hook (52) thus holds the Third Embodiment Main Body (50) against movement by way of the Snap Hook Containment Loop (20). The belayer need only pull on the First Snap Hook (24) with one hand in order to feed out or take in the Rope (26) with the other hand. If the climber falls, the belayer releases the First Snap Hook (24) thereby allowing the Rope (26) to pull the First Snap Hook (24), from the direction of the Rope Fixed End (32), into the Third Embodiment Main Body (50) thus causing the Rope (26) to be stopped by pinch force between the First Snap Hook (24) and the Third Embodiment Main Body (50). The Extended Ends (48) provide a fulcrum surface allowing two sides of the First Snap Hook (24) to act as a lever in order to pry the pinched section of Rope (26) away from the Third Embodiment Main Body (50), as shown in FIG. 11, thus releasing the lock on the Rope (26).

FIG. 12 presents a Fourth Embodiment Simple Climber's Multi-Tool (56) demonstrating the use of the device as an auto-locking belay device for two ropes. The device is analogous to the Third Embodiment Simple Climber's Multi-Tool (46) with the exception that the Fourth Embodiment Main Body (58) has Fourth Embodiment Dual Rope Channels (60). The Rope (26) is not shown in this figure in order to better illustrate the Fourth Embodiment Dual Rope Channels (60).

CONCLUSION, RAMIFICATIONS, AND SCOPE

Thus the reader will see that the subject invention is a simple climber's multi-tool that performs several safety functions for climbing activities the totality of which heretofore have required several different devices. The device also fulfills a currently unmet need for a convenient light-weight safety back-up device to be used with a solo climbing belay device. It functions as an auto-locking belay device or as a back-up safety device for a belay device. It provides easy and controlled release of a load once a rope has been jammed by the device. Certain embodiments of the device can accommodate two ropes simultaneously. The subject invention can also function as a standard manual belay and rappel device, and with the addition of a small piece of cord, can perform many of the functions performed by safety back-up knots such as the Prusik knot, the Bachman knot, and the Klemheist knot.

While the above description contains many specifics, these should not be construed as limitations on the scope of the invention, but rather as examples of four embodiments thereof. Each piece described within the aforementioned embodiments could be changed in form in ways that would not affect its function. Accordingly, the scope of the invention should be determined not by the embodiments illustrated, but by the appended claims and their legal equivalents.

I claim:

1. A device, offering safety functionalities for rock climbing heretofore only provided by multiple devices and uniquely suited as a back-up safety device for a solo climbing belay device, which when joined to a rope allows easy relative movement between said rope and said device when a first portion of said device is gripped and pulled with respect to either end of said rope, but can jam said rope against movement when a second portion of said device is constrained from movement and an end of said rope is pulled with respect to said device; said rope foldable to form a first rope strand, a second rope strand, and a looped portion between said first rope strand and said second rope strand, said device comprising:

a main body, a snap hook containment loop attached to said main body, and a first snap hook;

said main body having a front face with an open front area, a back face with an open back area opposite said open front area, and a rope channel extending between said open front area and said open back area;

said rope channel having a width, measured between two side walls of said rope channel, equal to, or larger than, two diameters of said rope and a height approximately equal to one diameter of said rope;

when viewed along said width of said rope channel, a middle portion of said back face being recessed from two end portions of said back face;

a sloping recessed face and a non-sloping recessed face being formed by the recess of said middle portion;

when viewed from said back face toward said front face, said sloping recessed face sloping toward said non-sloping recessed face more than said non-sloping recessed face slopes toward said sloping recessed face, the portion of said sloping recessed face nearest said front face being less than one rope diameter in distance from the side wall of said rope channel nearest said non-sloping recessed face;

when in use as a rope jam said first rope strand and said second rope strand extending through said rope channel and said looped portion extending beyond said back face, said first snap hook positioned through both said looped portion and said snap hook containment loop and closed, the end of said rope extending beyond said front face on the side of said first snap hook nearest said sloping recessed face being the end causing said device to jam said rope if pulled with respect to said device.

2. The device of claim 1 further comprising an attachment means capable of attaching said main body to a harness of a belayer, said attachment means allowing said device to act as an auto-locking belay device by constraining said main body from movement relative to said harness.

3. The device of claim 2 wherein said attachment means comprises a second snap hook, said second snap hook capable of joining said snap hook containment loop to said harness of said belayer.

4. The device of claim 3 wherein the height of a portion of said main body, in a region near said back face, is longer than the distance between two opposing sides of said first snap hook, said portion of said device thus providing a fulcrum against which said two opposing sides of said first snap hook can act as a lever to pry said looped portion of said rope away from said middle portion of said back face once said device has locked said rope, thus allowing said first snap hook to act as a handle to release the lock on said rope.

5. The device of claim 3 wherein said second snap hook is a locking gate carabiner.

6. The device of claim 1 wherein said snap hook containment loop is pivotally attached to said main body at each of two points on opposing sides of said main body, said snap hook containment loop thus able to be positioned to extend beyond said back face in a first configuration and to extend beyond said front face in a second configuration, positioning of said snap hook containment loop in said second configuration allowing said device to function as a standard manual belay and rappel device when said first rope strand and said second rope strand extend through said rope channel and said looped portion extends beyond said front face, said first snap hook positioned through both said looped portion and said snap hook containment loop and closed.

7. The device of claim 1 further comprising, within said main body, a second rope channel with a second open front area and a second open back area, said second rope channel located adjacent to said rope channel.

8. The device of claim 7 wherein said snap hook containment loop is pivotally attached to said main body at each of two points on opposing sides of said main body, said snap hook containment loop thus able to be positioned to extend beyond said back face in a first configuration and to extend beyond said front face in a second configuration, positioning of said snap hook containment loop in said second configuration allowing said device to function as a standard manual belay and rappel device for two ropes.

9. The device of claim 1 wherein said main body is comprised of machined aluminum.

10. The device of claim 1 wherein said main body is comprised of machined steel.

11. The device of claim 1 wherein said main body is comprised of cast aluminum.

12. The device of claim 1 wherein said main body is comprised of cast steel.

13. The device of claim 1 wherein said main body is comprised of stamped aluminum.

14. The device of claim 1 wherein said main body is comprised of stamped steel.

15. The device of claim 1 where in said snap hook containment loop is comprised of solid steel.

16. The device of claim 1 wherein said snap hook containment loop is comprised of solid aluminum.

17. The device of claim 1 wherein said snap hook containment loop is comprised of braided steel wire cable.

18. The device of claim 1 wherein said first snap hook is a locking gate carabiner.

* * * * *